United States Patent
Reiser

(10) Patent No.: US 9,125,277 B2
(45) Date of Patent: Sep. 1, 2015

(54) RETROFIT LAMP

(71) Applicant: OSRAM GmbH, Munich (DE)

(72) Inventor: Ludwig Reiser, Biberach (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/253,879

(22) Filed: Apr. 16, 2014

(65) Prior Publication Data

US 2014/0320018 A1    Oct. 30, 2014

(30) Foreign Application Priority Data

Apr. 29, 2013   (DE) .......................... 20 2013 004 107

(51) Int. Cl.
   *H05B 37/02*    (2006.01)
   *H05B 33/08*    (2006.01)
(52) U.S. Cl.
   CPC ........ *H05B 33/0884* (2013.01); *H05B 33/0803* (2013.01); *Y02B 20/383* (2013.01)
(58) Field of Classification Search
   CPC ............................... H05B 37/02; H05B 33/08
   USPC .......... 315/122, 193, 291, 294, 312, 187, 201
   See application file for complete search history.

(56) References Cited

U.S. PATENT DOCUMENTS

| | | | | |
|---|---|---|---|---|
| 5,463,280 | A * | 10/1995 | Johnson | 315/187 |
| 7,250,730 | B1 * | 7/2007 | Allen | 315/185 R |
| 2009/0058312 | A1 * | 3/2009 | Weijs et al. | 315/193 |
| 2012/0242241 | A1 | 9/2012 | Schmacht | |

FOREIGN PATENT DOCUMENTS

| | | |
|---|---|---|
| DE | 102011005968 A1 | 9/2012 |
| WO | 2011014111 A1 | 2/2011 |
| WO | 2011124670 A1 | 10/2011 |
| WO | 2012127371 A1 | 9/2012 |
| WO | 2013005751 A1 | 1/2013 |

OTHER PUBLICATIONS

Search Report issued in the corresponding German application No. 202013004107.2, dated Jan. 17, 2014.

* cited by examiner

*Primary Examiner* — Daniel D Chang

(57) ABSTRACT

A retrofit lamp includes at least one series circuit having a multiplicity of LEDs having a circuit arrangement. The at least one series circuit including is coupled between a first rectifier output connection and a second rectifier output connection. A breakdown apparatus is coupled between a third connection terminal and a fourth connection terminal. The breakdown apparatus may have the following properties: up to a first threshold value of the voltage drop across said breakdown apparatus during operation, the breakdown apparatus is nonconducting. If the first threshold value is exceeded, the breakdown apparatus becomes conducting. The breakdown apparatus remains conducting as long as current is supplied to it which is above a second threshold value. As soon as the current falls below the second threshold value, the breakdown apparatus becomes nonconducting again. In the conducting state, the breakdown apparatus has a forward voltage which is below a third threshold value.

12 Claims, 1 Drawing Sheet

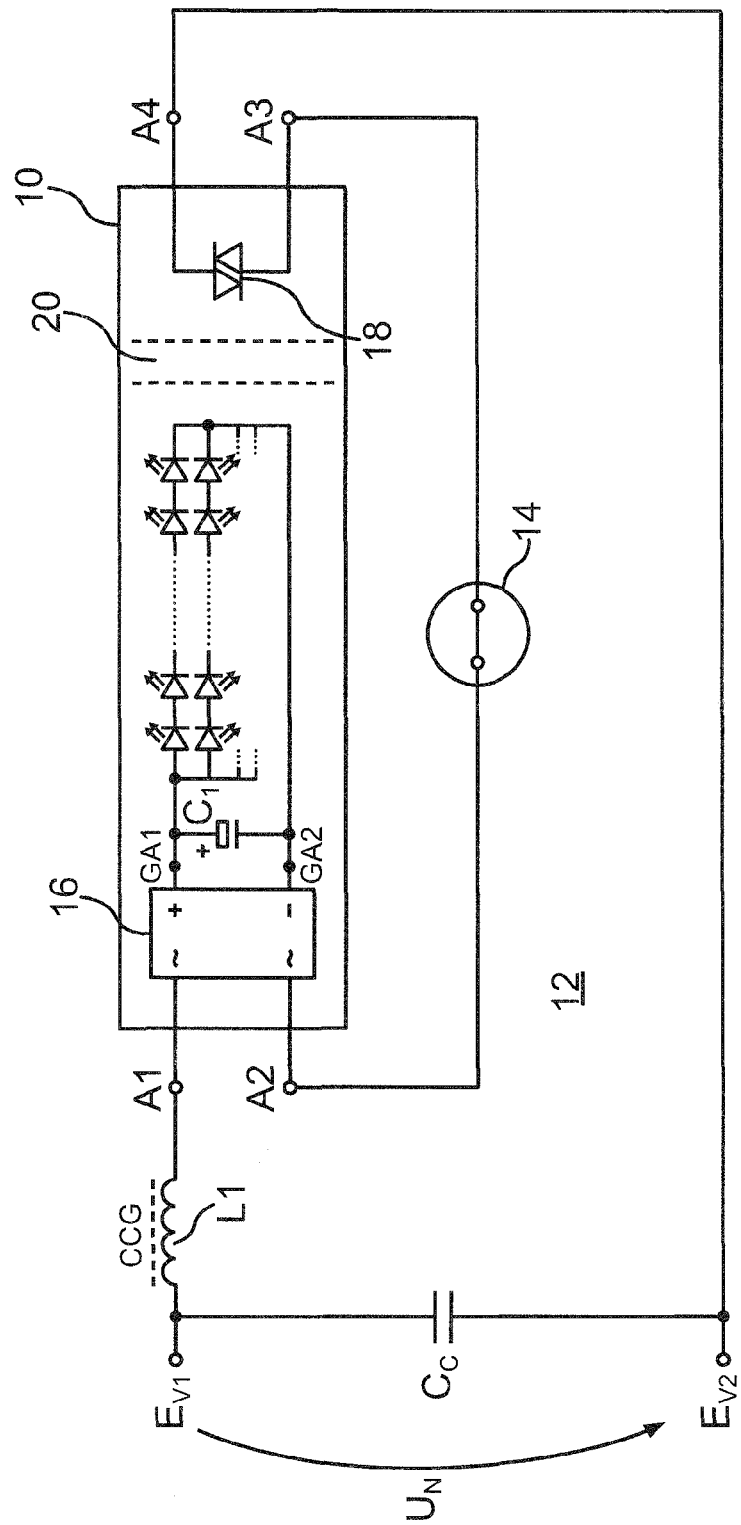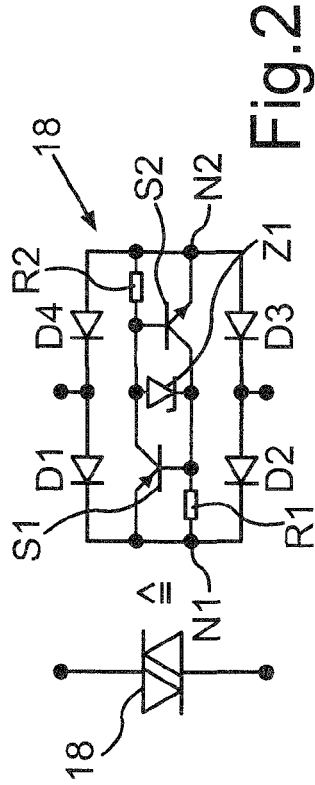

RETROFIT LAMP

CROSS-REFERENCE TO RELATED APPLICATION

This application claims priority to German Patent Application Serial No. 20 2013 004 107.2, which was filed Apr. 29, 2013, and is incorporated herein by reference in its entirety.

TECHNICAL FIELD

Various embodiments relate generally to a retrofit lamp including at least one series circuit including a multiplicity of LEDs including a circuit arrangement having a first connection with a first connection terminal and a second connection terminal, a second connection with a third connection terminal and a fourth connection terminal, a rectifier, whose input is coupled to the first connection and whose output includes a first rectifier output connection and a second rectifier output connection, wherein the at least one series circuit including a multiplicity of LEDs is coupled between the first rectifier output connection and the second rectifier output connection.

BACKGROUND

LED replacement products for fluorescent lamps, in particular in tubular form, for example "T5" or "T8" with lengths of 59, 120 or 150 cm, are known under the designation retrofit lamps. Criteria for retrofit lamps with a base at two ends as a replacement for fluorescent lamps are set down in the standard IEC 62776. In particular, in this case very stringent requirements are placed on the test voltage from one side of the lamp to the other side of the lamp, to be precise 4*U+2000 V, where U is the operating voltage, which gives 2960 V on an operating voltage of 240 V. Thus, in the case of a retrofit lamp which is inserted into a luminaire on one side, even when a voltage of approximately 3000 V AC is applied, there should be no flashover to the uninserted side of the retrofit lamp. In order to be able to adhere to this specification, it has become commonplace in the case of known retrofit lamps for said retrofit lamps to have their electrical connection on only one side, while the other side merely loops through the electrical current, precisely as in the case of the starter which is replaced by a replacement starter which represents a short circuit electrically.

Care is therefore taken in the interior design of the retrofit lamp to ensure that sufficient leakage paths and air gaps are maintained between the printed circuit board bearing the LEDs and the electronics for operating the LEDs, which are coupled to the first connection, on one side, and to the second connection on the other side, in order to be able to maintain the abovementioned dielectric strength of at least 3000 V AC test voltage.

In the past, during operation of such known retrofit lamps on different ballasts, sometimes damage, and even failure of the ballasts have been observed.

SUMMARY

A retrofit lamp includes at least one series circuit having a multiplicity of LEDs having a circuit arrangement. The at least one series circuit including is coupled between a first rectifier output connection and a second rectifier output connection. A breakdown apparatus is coupled between a third connection terminal and a fourth connection terminal. The breakdown apparatus may have the following properties: up to a first threshold value of the voltage drop across said breakdown apparatus during operation, the breakdown apparatus is nonconducting. If the first threshold value is exceeded, the breakdown apparatus becomes conducting. The breakdown apparatus remains conducting as long as current is supplied to it which is above a second threshold value. As soon as the current falls below the second threshold value, the breakdown apparatus becomes nonconducting again. In the conducting state, the breakdown apparatus has a forward voltage which is below a third threshold value.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a schematic illustration of a first embodiment of a retrofit lamp, inserted into a schematically illustrated luminaire including a conventional ballast; and FIG. 2 shows a schematic illustration of an embodiment, in which the breakdown apparatus is implemented by a SIDAC equivalent circuit.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments develop a retrofit lamp of the generic type in such a way that, firstly, the risk of damage to or failures of ballasts which operate such a retrofit lamp can be reduced, and secondly reliable operation of the retrofit lamp can be made possible.

Various embodiments are based on the knowledge that the ballasts which are damaged or destroyed during operation by conventional retrofit lamps have structural similarities. These are ballasts which, in order to heat the filaments, provide, in the manner of a transformer, electrical voltage for the filaments, for example so-called rapid start ballasts which are primarily in widespread use in countries with a low mains voltage such as the USA and Japan. If an LED (light emitting diode) retrofit lamp is operated using such a ballast and the LED retrofit lamp has a short circuit for transferring the current on one side, this short circuit can overload the transformer-based filament heating and damage the transformer since the transformer windings are designed for the filament resistances of the fluorescent lamp which is intended to be replaced by the retrofit lamp.

Moreover, it is necessary to take into consideration the fact that the abovementioned standard IEC 62776 includes the requirement that, on a heating voltage of 3.6 V, the current flowing of the filament heating needs to be less than 0.51 A. If a short-circuiting link is used for looping through, the short-circuit current is considerably higher.

If, in order to avoid damage to or destruction of a ballast, a fuse is inserted in series into the short-circuiting link, which fuse is configured such that it does not yet trip in the case of a normal, looped-through current flow for supplying electrical energy to the abovementioned electronics via the first connection, but trips reliably in the case of operation using a rapid start ballast or a ballast with transformer-based heating (usually dimmable ballasts) before the transformer can overheat, the following disadvantages result however:

Firstly, the retrofit lamp is destroyed by the response of the fuse, which in principle is allowed in the case of improper use but disappoints the end user. Secondly, it is extremely difficult to design the fuse optimally since the difference between the normal operating current and the short-circuit current of a heating transformer with an unknown internal resistance and a possibly long feed line, which does not have a very low resistance, is not very great. Therefore, the tripping value of the fuse needs to be very close to the normal operating current, as a result of which the reliability is reduced. To this extent, the abovementioned object is achieved to an unsatisfactory extent by the use of a fuse.

Various embodiments therefore take the approach of a breakdown apparatus being coupled between the third connection terminal and the fourth connection terminal, said breakdown apparatus having the following properties: up to a first predeterminable threshold value of the voltage drop across said breakdown apparatus during operation, said breakdown apparatus is nonconducting. If this first predeterminable threshold value is exceeded, said breakdown apparatus becomes conducting. Said breakdown apparatus remains conducting as long as current is supplied to it which is above a second predeterminable threshold value. As soon as the current falls below the second predeterminable threshold value, said breakdown apparatus becomes nonconducting again. Finally, in the conducting state, said breakdown apparatus has a forward voltage which is below a third predeterminable threshold value.

By virtue of the measure according to various embodiments, in contrast to protection by means of a fuse, the retrofit lamp becomes unusable in the case of erroneous operation using a rapid start ballast or using another conventional ballast with transformer-based filament heating. Instead, firstly protection for the person inserting the retrofit lamp into a luminaire which does not make the retrofit lamp unusable in the case of erroneous coupling to a ballast not intended for this purpose, and secondly reliable operation of a retrofit lamp according to various embodiments is enabled.

In various embodiments, the breakdown apparatus is a SIDAC or a TRIAC. As a result, the properties specified above for the breakdown apparatus can be realized in a particularly simple and inexpensive manner in a single component. In various embodiments, SIDAC types are as follows: Shindengen Z314 K1VZL09 or K1VZL20.

Alternatively, a SIDAC equivalent circuit may also be selected as breakdown apparatus. In various embodiments, the SIDAC equivalent circuit includes a fifth connection terminal and a sixth connection terminal for coupling to the third connection terminal and the fourth connection terminal of the second connection, a first diode, a second diode, a third diode and a fourth diode in a full-bridge arrangement, wherein the connecting point between the first diode and the second diode is a first node, and the connecting point between the third diode and the fourth diode is a second node, a first electronic switch and a second electronic switch, which are designed in complementary fashion to one another and each include a control electrode, a working electrode and a reference electrode, a first ohmic resistor and a second ohmic resistor, and a Zener diode, wherein the reference electrode of the first electronic switch is coupled to the first node, wherein the control electrode of the first electronic switch is coupled firstly to the first node via the first ohmic resistor and secondly to the working electrode of the second electronic switch, wherein the reference electrode of the second electronic switch is coupled to the second node, wherein the control electrode of the second electronic switch is coupled firstly to the second node via the second ohmic resistor and secondly to the working electrode of the first electronic switch, wherein the Zener diode is coupled between the control electrodes of the first electronic switch and of the second electronic switch. A SIDAC equivalent circuit provides the advantage that the above-described threshold values can be optimized individually.

It has proven to be advantageous if the first predeterminable threshold value is between 10 V and 50 V, e.g. 25 V. Thus, the breakdown voltage is safely not reached by a transformer-based filament heating (test voltage 3.6 V).

It has furthermore proven to be advantageous if the second predeterminable threshold value is between 5 mA and 20 mA, e.g. 10 mA. This ensures that the breakdown apparatus becomes nonconducting again after an interruption to the mains voltage.

Finally, it has proven to be advantageous if the third predeterminable threshold value is as low as possible, technically a value of between 0.5 V and 2 V can be achieved. This criterion would not be met by a DIAC, which would result in an undesirably high power loss in the breakdown apparatus. Over a long period of time, this high power loss would result in destruction of the DIAC. In the case of the third predeterminable threshold value which is advantageously specified, on the other hand, the power converted in the breakdown apparatus once the breakdown apparatus has become conducting is at most 4 W, e.g. at most 1 W.

Owing to the first and third predeterminable threshold value selected as mentioned above, the breakdown apparatus has only a slight influence on the operation of the LEDs since, at mains voltage, the first predeterminable threshold value is exceeded very soon and, after breakdown of the breakdown apparatus, only a small amount of voltage for operating the LEDs at the breakdown apparatus is lost.

The retrofit lamp may furthermore include a capacitor, which is coupled between the first and second rectifier output connections. In this way, filtering may be performed in order to provide a current with reduced current ripple to the LEDs.

FIG. 1 shows a schematic illustration of an embodiment of a retrofit lamp 10, which is coupled to a conventional ballast 12 of a luminaire. The retrofit lamp 10 may have a T5 or a T8 housing. The ballast 12 has an input including a first input connection $E_{V1}$ and a second input connection $E_{V2}$ for coupling to a mains voltage $U_N$. The mains voltage $U_N$ is conventionally between 100 V and 240 V and has a frequency of between 50 Hz and 60 Hz. In the conventional ballast 12, a conventional ballast inductor L1 is provided for current limitation, which inductor is coupled between the input connection $E_{V1}$ and a first connection terminal A1. A compensation capacitor $C_C$ is coupled between the input connections $E_{V1}$ and $E_{V2}$ and is used for compensating for the inductive component introduced into the system by the conventional ballast inductor L1 and therefore for compensating for the inductive reactive power. A short-circuiting apparatus 14 is provided between a second connection terminal A2 and a third connection terminal A3 and is used to replace the starter originally provided at this point. A fourth connection terminal A4 is coupled to the second input connection $E_{V2}$. The four connection terminals A1, A2, A3, A4 at the same time represent connection terminals for the retrofit lamp 10, which therefore replaces a fluorescent lamp originally intended for operation with the conventional ballast 12.

In the retrofit lamp 10, a multiplicity of LEDs is provided, wherein, in this case, a plurality of strings which each comprise a plurality of LEDs are connected in parallel. The driver electronics illustrated in FIG. 1 for the LEDs is a very simple embodiment and includes only one rectifier 16, between whose output connections GA1 and GA2 a capacitor $C_1$ for smoothing the current provided to the LEDs is coupled. On the input side, the rectifier 16 is coupled to the connection terminals A1 and A2. Of course, instead of this simple embodiment, it is also possible for substantially more complex drivers to be provided without the principle of the present invention thus being affected.

In accordance with various embodiments, a SIDAC 18 is coupled between the third connection terminal A3 and the fourth connection terminal A4 and remains at a high resistance, i.e. nonconducting, up to a predeterminable threshold value for the voltage applied to it, but, when this first predeterminable threshold value is exceeded, turns on, i.e. becomes conducting, and remains conducting as long as a current is supplied to it which is above a second predeterminable threshold value. If the current falls below the second predeterminable threshold value, however, the SIDAC 18 becomes nonconducting again.

Its forward voltage in the conducting state is below a predeterminable third threshold value. In contrast to a DIAC, a SIDAC has, in the turned-on state, only a low forward voltage, usually in the range of from 0.5 V to 2 V, as a result of which the forward losses remain low. The first predeterminable threshold value is between 10 V and 50 V, e.g. 25 V, while the second predeterminable threshold value is between 5 mA and 20 mA, e.g. 10 mA.

The driver electronics, in this case the rectifier 16, the capacitor $C_C$ and the capacitor $C_1$ as well as the LEDs, on one side, and the SIDAC 18, on the other side, are in this case mounted on separate printed circuit boards which are arranged at a distance 20 from one another in order to prevent a flashover of a test voltage of at least 3000 V. If the driver electronics, the LEDs and the SIDAC 18 are mounted on one and the same printed circuit board, the distance 20 can also only be provided between the relevant component parts on the printed circuit board. The minimum breakdown voltage of the SIDAC 18 or of a SIDAC equivalent circuit is selected such that it is safely above the peak value for the output voltage of a heating transformer of a conventional ballast including transformer-based filament heating. Conventional values for this are 3.6 V, with the result that, with the first predeterminable threshold value of between 10 V and 50 V as mentioned above, sufficient safety is ensured. The breakdown voltage should not be selected to be too high since, otherwise, it influences the power and the current flow angle of the retrofit lamp 10 since, before the breakdown voltage is reached, there can also be no onset of current flow to the connection terminals A1, A2 (in the case of the retrofit lamp 10 inserted correspondingly into the luminaire).

Instead of a SIDAC 18, a SIDAC equivalent circuit can also be provided, as is illustrated in accordance with various embodiments as shown in FIG. 2.

In the SIDAC equivalent circuit illustrated in FIG. 2, a full-bridge is provided, which includes four diodes D1 to D4, which e.g. are in the form of Schottky diodes. A combination including a pnp transistor S1 and an npn transistor S2 is arranged in the path from a connection terminal to the opposite connection terminal. Alternatively, a thyristor can also be used, or a TRIAC, wherein, in the lastmentioned case, it is possible to dispense with the diode full-bridge.

The cathode of a Zener diode Z1 (or another component part with a predetermined breakdown voltage, such as a DIAC or a varistor, for example) is connected to the base of the pnp transistor S1. If the voltage present at the two connection terminals exceeds the threshold voltages of the two diodes operated in the forward direction in the full bridge plus the threshold voltages of the bases of the transistors S1 and S2 plus the threshold voltage of the Zener diode Z1, a current flow is established which is distributed between the base connections of the two transistors S1, S2, which therefore supply one another with control current. Thus, the forward voltage of the assembly between the two connection terminals decreases markedly and the losses become low. The resistors R1 and R2 which are coupled between the respective base and the respective emitter of the transistors S1, S2 make it possible to establish a minimum current, i.e. the second predeterminable threshold value, above which the SIDAC equivalent circuit 18 is intended to toggle back to the high-resistance state. In this case, one of the two ohmic resistors R1, R2 can also be dispensed with.

Mode of operation: If the voltage between the nodes N1 and N2 exceeds the sum of the threshold voltage of the emitter-base path of the transistor S1, the breakdown voltage of the Zener diode Z1, and the threshold voltage of the base-emitter path of the transistor S2, the transistors S1 and S2 become conducting and, from this breakdown on, supply one another with base current. This results in the SIDAC equivalent circuit 18 breaking down, i.e. the voltage between the two connection terminals breaks down to values of between 0.5 V and 2 V. The AC voltage suitability is ensured by the full-bridge, which includes the diodes D1 to D4.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A retrofit lamp comprising at least one series circuit comprising a multiplicity of light emitting diodes comprising a circuit arrangement, the circuit arrangement comprising:
   a first connection with a first connection terminal and a second connection terminal;
   a second connection with a third connection terminal and a fourth connection terminal;
   a rectifier, whose input is coupled to the first connection and whose output comprises a first rectifier output connection and a second rectifier output connection;
   wherein the at least one series circuit comprising a multiplicity of light emitting diodes is coupled between the first rectifier output connection and the second rectifier output connection;
   wherein a breakdown apparatus is coupled between the third connection terminal and the fourth connection terminal, said breakdown apparatus having the following properties:

up to a first predeterminable threshold value of the voltage drop across said breakdown apparatus during operation, said breakdown apparatus is nonconducting;

if the first predeterminable threshold value is exceeded, said breakdown apparatus becomes conducting;

said breakdown apparatus remains conducting as long as current is supplied to it which is above a second predeterminable threshold value;

as soon as the current falls below the second predeterminable threshold value, said breakdown apparatus becomes nonconducting again; and in the conducting state, said breakdown apparatus has a forward voltage which is below a third predeterminable threshold value.

2. The retrofit lamp of claim 1,
wherein the breakdown apparatus is a SIDAC or a TRIAC.

3. The retrofit lamp of claim 1,
wherein the breakdown apparatus is a SIDAC equivalent circuit.

4. The retrofit lamp of claim 1,
wherein the SIDAC equivalent circuit comprises:
  a fifth connection terminal and a sixth connection terminal for coupling to the third connection terminal and the fourth connection terminal of the second connection;
  a first diode, a second diode, a third diode and a fourth diode in a full-bridge arrangement, wherein the connection point between the first diode and the second diode is a first node, and the connecting point between the third diode and the fourth diode is a second node;
  a first electronic switch and a second electronic switch which are designed in complementary fashion to one another and each comprise a control electrode, a working electrode and a reference electrode;
  a first ohmic resistor and a second ohmic resistor;
  a Zener diode;
  wherein the reference electrode of the first electronic switch is coupled to the first node, wherein the control electrode of the first electronic switch is coupled firstly to the first node via the first ohmic resistor and secondly to the working electrode of the second electronic switch;
  wherein the reference electrode of the second electronic switch is coupled to the second node, wherein the control electrode of the second electronic switch is coupled firstly to the second node via the second ohmic resistor and secondly to the working electrode of the first electronic switch;
  wherein the Zener diode is coupled between the control electrodes of the first electronic switch and of the second electronic switch.

5. The retrofit lamp of claim 1,
wherein the first predeterminable threshold value is in the range from 10 V to 50 V.

6. The retrofit lamp of claim 5,
wherein the first predeterminable threshold value is about 25 V.

7. The retrofit lamp of claim 1,
wherein the second predeterminable threshold value is in the range from 5 mA to 20 mA, preferably 10 mA.

8. The retrofit lamp of claim 7,
wherein the second predeterminable threshold value is about 10 mA.

9. The retrofit lamp of claim 1,
wherein the third predeterminable threshold value is in the range from 0.5 V and 2 V.

10. The retrofit lamp of claim 1,
wherein the power converted in the breakdown apparatus once the breakdown apparatus has become conducting is at most 4 W.

11. The retrofit lamp of claim 10,
wherein the power converted in the breakdown apparatus once the breakdown apparatus has become conducting is at most 1 W.

12. The retrofit lamp of claim 1,
wherein said retrofit lamp furthermore comprises a capacitor, which is coupled between the first rectifier output connection and the second rectifier output connection.

* * * * *